Inventors
R.J. Dixon
L. Jones

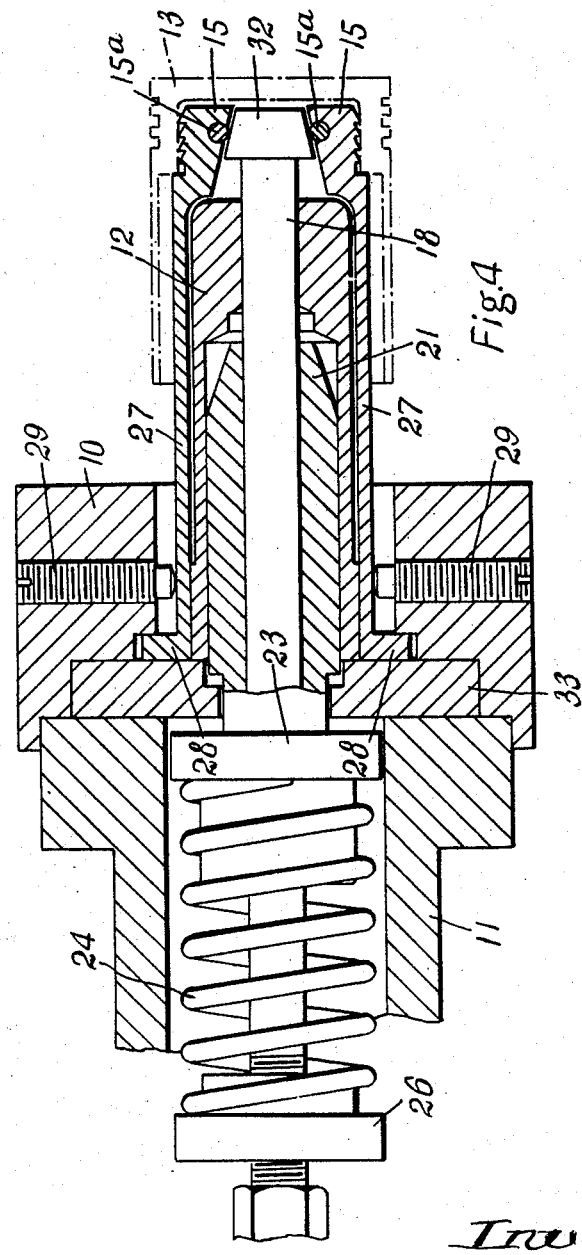

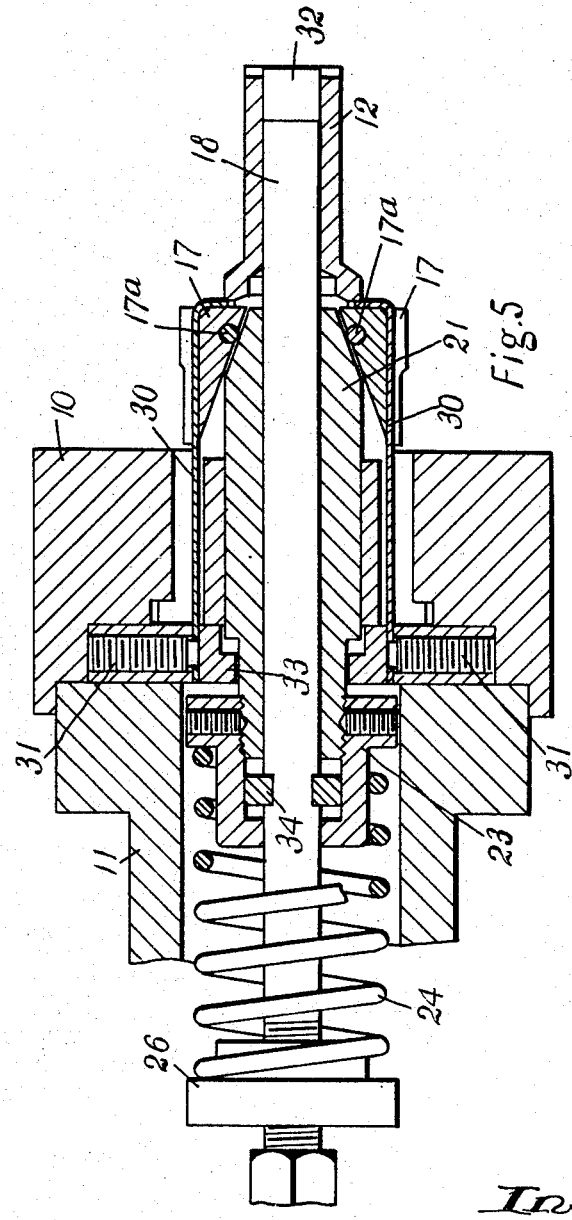

United States Patent Office 2,957,699
Patented Oct. 25, 1960

2,957,699

LATHE CHUCKS

Reginald John Dixon, Solihull, and Lewis Jones, Coventry, England, assignors to Wickman Limited, Coventry, Warwickshire, England Filed Nov. 24, 1958, Ser. No. 776,059

6 Claims. (Cl. 279—2)

This invention relates to lathe chucks of the kind employed for gripping the interior of a hollow cylindrical work piece, such as an internal combustion engine piston, on which it is required to perform external cutting operations.

The object of the invention is to provide a chuck of improved construction which whilst ensuring a secure grip on the work piece minimises risk of distortion of the work piece.

A chuck in accordance with the invention comprises a body part adapted to be secured to the driving spindle of the lathe, a hollow nose piece extending centrally from the body part and adapted to enter the work piece, a pair of oppositely disposed jaws situated at the forward end of the nose piece and adapted to grip the forward end of the work piece, a second pair of oppositely disposed jaws in a plane at right angles to the plane containing the first mentioned jaws and adapted to grip the rear end of the work piece, an axially slidable spindle for actuating the first mentioned jaws, and an axially slidable sleeve mounted on the spindle for actuating the second mentioned jaws.

Figure 1:
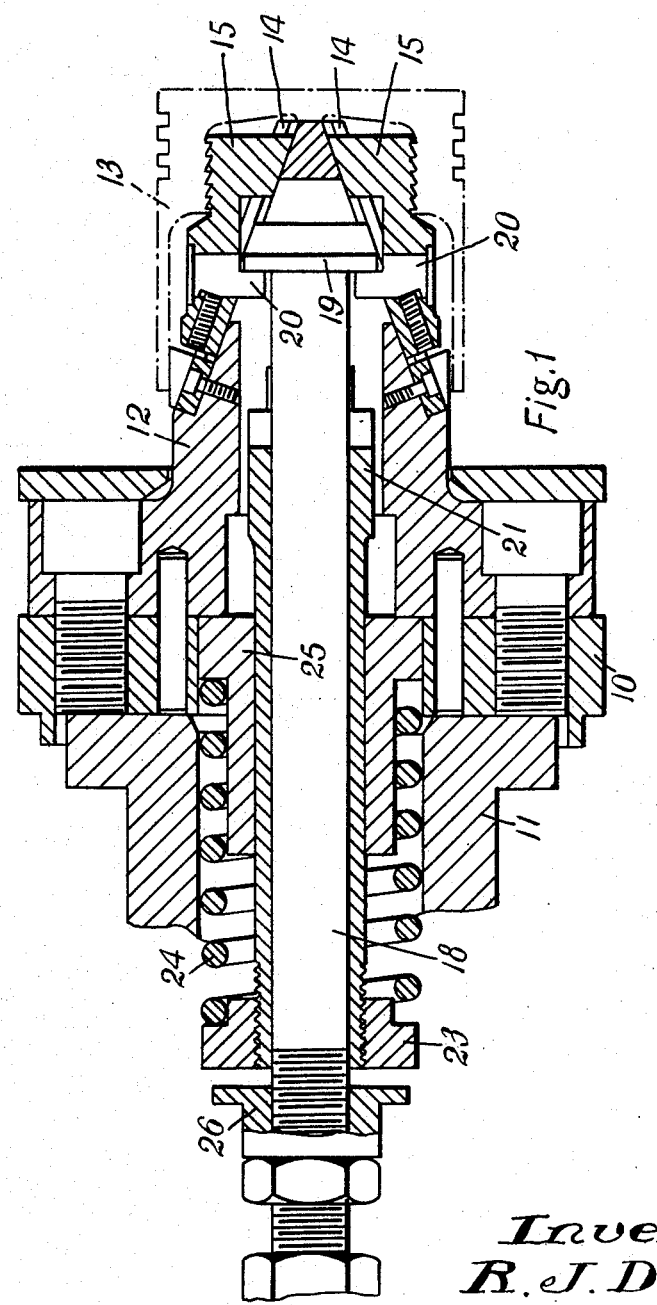
Figure 2:
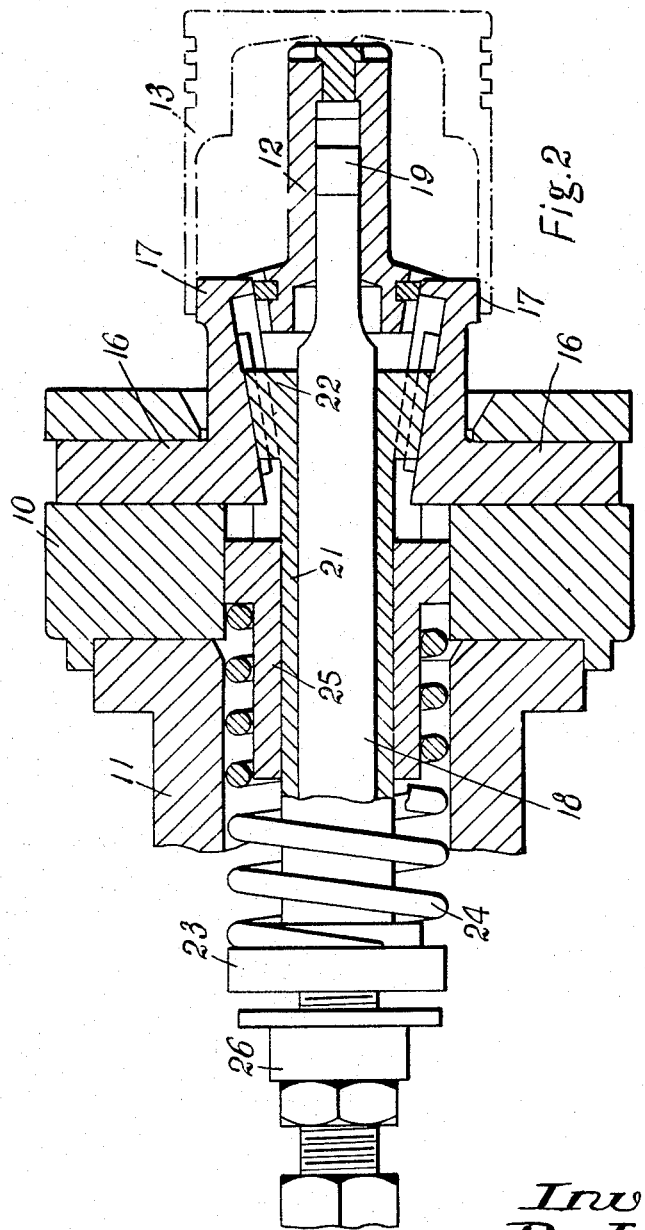
Figure 3:
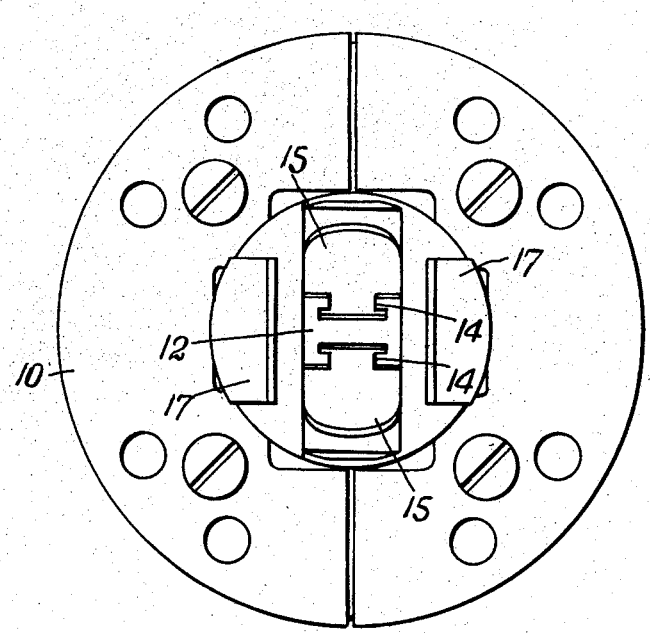
Figure 6:
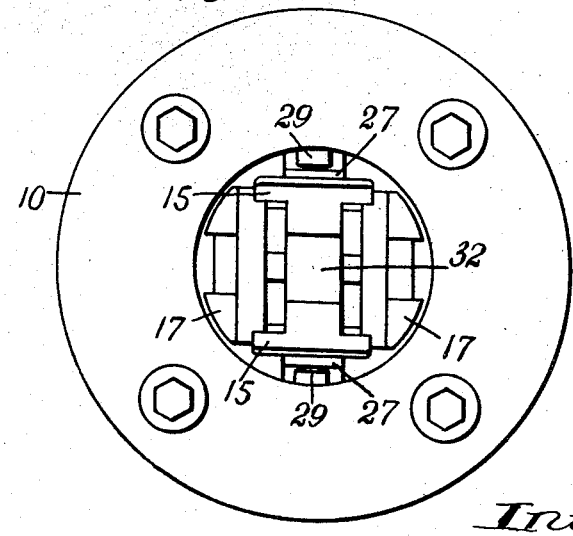

In the accompanying drawings:

Figures 1 and 2 are sectional elevations in planes which are mutually at right angles illustrating a chuck embodying the invention, Figure 3 being an end view of the chuck. Figures 4 and 5 are respectively similar views to Figures 1 and 2 illustrating an alternative embodiment of the invention, and Figure 6 is an end view.

Referring to Figures 1–3, the body part 10 of the chuck is adapted to be secured to the hollow driving spindle 11 of the lathe. To the body part is centrally secured a forwardly extending hollow nose piece 12 adapted to enter the work piece 13, which in the example shown is an engine piston.

On the forward end of the nose piece are formed two oppositely disposed inclined guides 14, and on these guides are slidably supported a pair of jaws 15, such that when moved axially in one direction are also caused to move radially outwards for gripping the interior of the work piece at a position adjacent to its forward end.

Within the body part are formed a pair of radial grooves which carry a pair of radially disposed slides 16 from which extend a second pair of jaws 17, these being disposed in a plane at right angles to the jaws 15 and being adapted to grip the work piece at or near its rear end.

Within the chuck is contained an axially slidable spindle 18 which is connected at its rear end to a pneumatically or otherwise operable means (not shown) and the forward end of the spindle has formed on it an outward extension 19 adapted to abut against a pair of inwardly extending pins 20 on the jaws 15.

On the spindle is supported an axially slidable sleeve 21 which at its forward end has formed on it inclined extensions 22 which co-operate with inclined grooves in the adjacent portions of the jaws 17. At the rear end of the sleeve is secured an adjustable collar 23 which serves as an abutment for a helical spring 24 mounted on the sleeve and supported at its other end by a collar 25 carried by the body part of the chuck. Also on the spindle is adjustably secured a collar 26 which by pressure against the collar 23 on the sleeve can move the latter in opposition to the action of the spring.

The arrangement is such that after the work piece has been placed in position on the jaws, an initial movement of the spindle allows the spring 24 to move the sleeve in the direction for expanding the jaws 17 into engagement with the rear end of the work piece. Continued movement of the spindle then expands the jaws 15 into engagement with the forward end of the work piece. In this condition the various parts occupy the positions shown by Figures 1 and 2. With return of the spindle the jaws are returned to their initial positions for release of the work piece.

A chuck as above described when used for holding an engine piston as shown, exerts its strongest grip on the forward end of the work piece where the metal is thick and not easily distortable by the force exerted by the forward jaws, the other force exerted on the rear jaws being determined by the spring, and this is made such that it can cause no undesirable distortion on the relatively thin skirt of the piston.

Whilst the chuck is primarily intended for holding engine pistons, it is not restricted to such use as it may also be employed for holding other analogous work pieces. Further the invention is not limited to the particular construction above described as subordinate details may be varied.

In the example shown in Figures 4–6 the body part 10, which is adapted to be secured to the hollow driving spindle 11, has attached to it a forwardly extending central nose piece 12 adapted to enter the work piece 13. On opposite sides of the nose piece are supported a pair of resilient cantilever arms 27 on the forward ends of which are formed the jaws 15 adapted to grip the forward end of the work piece 13. The inner ends of these arms have formed on them the retaining pieces 28 which engage the interior of the body part 10, the arms being also retained in slots in the nose piece 12 by screws 29 engaged in the body part and impinging against the arms. Also there are provided a second pair of resilient arms 30, these being located in a plane at right angles to the arms 27. To the forward ends of the arms 30 are attached the jaws 17 which grip the rear end of the work piece, these arms being secured in slots in a retaining plate 33 by screws 31, the plate 33 being retained in the body part. Within the nose piece is contained the axially slidable spindle 18 having at its forward end a wedge 32 adapted to move the jaws 15 outwardly either directly or through rollers 15$^a$. Also on the spindle is mounted an axially slidable sleeve 21 having a wedge-shaped forward end adapted to move the jaws 17 into engagement with the rear end of the work piece either directly or through rollers 17$^a$. On the spindle and sleeve respectively are secured collars 26 and 23 between which is contained the spring 24, the collar 23 being permitted limited axial movement on the rod due to a part of the collar which is shaped to contact a C-shaped abutment 34 engaging a circumferential groove in the rod.

The arrangement is such that on movement of the spindle 18 to the right as viewed in Figures 4 and 5 the sleeve 21 will first expand the jaws 17 into engagement with the rear end of the work piece. Continued movement of the spindle in this direction will then expand the jaws 15 into engagement with the forward end of the work piece and compress the spring 24 so as to cause it to exert a predetermined outward pressure on the jaws 17, this pressure being relatively light so as to obviate risk of distortion of the rear end of the work piece, When the spindle is moved in the opposite direction the jaws 15 are first allowed to move inwardly whilst the pressure of the spring 24 is released. Subsequently the abutment 34 will make contact with the collar 23 and withdraw the sleeve 21 to permit release of the jaws 17.

Having thus described our invention, what we claim as new and desire to secure by Letters Patent is:

1. A four-jaw lathe chuck comprising the combination of a body part adapted to be secured to a driving spindle of a lathe, a hollow nose piece extending centrally from the body part and adapted to enter the interior of a hollow cylindrical work piece, a single pair of oppositely disposed jaws situated at the forward end of the nose piece and expansible to grip the forward end of the work piece, a second single pair of oppositely disposed jaws at the rear end of the nose piece in a radial plane at right angles to a radial plane containing the first mentioned jaws and expansible to grip the rear end of the work piece, an axially slidable actuating spindle for expanding the first mentioned jaws, an axially slidable sleeve mounted on the actuating spindle for expanding the second mentioned jaws, a pair of axially spaced abutments which are capable of relative axial movement, and one of which is non-slidably carried by the sleeve, while the other surrounds the actuating spindle, a compression spring arranged between the abutments, and a third abutment non-slidably carried by the actuating spindle and arranged to permit movement of the sleeve under pressure of the spring for expanding the second mentioned jaws before the first mentioned jaws during movement of the actuating spindle in one direction, and to impart movement to the sleeve for releasing the second mentioned jaws following release of the first mentioned jaws during movement of the actuating spindle in the opposite direction.

2. A lathe chuck according to claim 1, and having means for adjustment of the initial position of the third abutment with respect to the sleeve.

3. A lathe chuck according to claim 1, and having guides through the medium of which the first mentioned jaws are supported on the nose piece so that they are capable of axial and radial movements relatively to the nose piece, radially movable slides through the medium of which the second mentioned jaws are carried by the body part, and means on the sleeve for actuating the slides.

4. A lathe chuck according to claim 1, and having two pairs of resilient cantilever arms respectively carrying the two pairs of jaws, and means securing the arms to the body part at the ends of the arms remote from the jaws.

5. A lathe chuck according to claim 1, in which said other abutment is carried by the body part and surrounds the sleeve.

6. A lather chuck according to claim 1, in which said other abutment is secured to the actuating spindle, and said one abutment surrounds the third abutment.

References Cited in the file of this patent
UNITED STATES PATENTS

| | | |
|---|---|---|
| 1,074,280 | Miller | Sept. 30, 1913 |
| 2,555,170 | Wall | May 29, 1951 |
| 2,739,818 | Benjamin | Mar. 27, 1956 |